United States Patent [19]

Zhen et al.

[11] Patent Number: 6,093,234
[45] Date of Patent: *Jul. 25, 2000

[54] PROCESS FOR PREPARING SUBMICRON/NANOSIZE CERAMIC POWDERS FROM PRECURSORS INCORPORATED WITHIN A POLYMERIC FOAM

[75] Inventors: Yong S. Zhen, Downers Grove; Kenneth Hrdina, Glenview, both of Ill.

[73] Assignee: Institute of Gas Technology, Des Plaines, Ill.

[*] Notice: This patent is subject to a terminal disclaimer.

[21] Appl. No.: 08/246,324

[22] Filed: May 19, 1994

Related U.S. Application Data

[63] Continuation of application No. 08/049,081, Apr. 20, 1993, Pat. No. 5,338,334, which is a continuation-in-part of application No. 07/821,228, Jan. 16, 1992, Pat. No. 5,240,493.

[51] Int. Cl.⁷ ........................................................ B22F 9/30
[52] U.S. Cl. .................................. 75/362; 501/82; 501/84
[58] Field of Search ................................. 75/362; 501/80, 501/82, 84

[56] References Cited

U.S. PATENT DOCUMENTS

| | | | |
|---|---|---|---|
| 5,240,493 | 8/1993 | Zhen et al. | 75/362 |
| 5,338,334 | 8/1994 | Zhen et al. | 75/362 |

FOREIGN PATENT DOCUMENTS

| | | |
|---|---|---|
| 2628665 | 9/1989 | France . |
| 1144033 | 3/1969 | United Kingdom . |

*Primary Examiner*—George Wyszomierski
*Attorney, Agent, or Firm*—Pauley Petersen Kinne & Fejer

[57] ABSTRACT

A process for preparing uniform, agglomerate free, submicron/nanosize ceramic powders from a polymeric foam comprising metal cations homogeneously incorporated within a foam cell structure of the polymeric foam. The polymeric foam is heated to remove any solvent, and calcined at a temperature of about 400° C. to about 1400° C. for about 1 minute to about 96 hours to produce the desired ceramic or metal powder.

16 Claims, No Drawings

PROCESS FOR PREPARING SUBMICRON/ NANOSIZE CERAMIC POWDERS FROM PRECURSORS INCORPORATED WITHIN A POLYMERIC FOAM

This is a continuation of U.S. patent application having Ser. No. 08/049,081, filed Apr. 20, 1993, now U.S. Pat. No. 5,338,334, which application is a continuation-in-part of U.S. patent application Ser. No. 07/821,228, filed Jan. 16, 1992, now issued as U.S. Pat. No. 5,240,493.

BACKGROUND OF THE INVENTION

1. Field of the Invention

This invention relates to a process for preparing uniform, agglomerate-free, submicron/nanosize ceramic powders for use as starting powders for high technology ceramics. In particular, this invention relates to a process for preparing uniform, agglomerate-free, submicron/nanosize ceramic powders from a precursor solution incorporated into a polymeric foam.

2. Description of the Prior Art

The usefulness of many high technology ceramics depends upon the characteristics of the ceramic powders used as starting powders which are sintered to produce a ceramic product. In general, to achieve desirable characteristics in the finished products, a ceramic powder should consist of particles with a narrow size distribution in the submicron range. In addition, to avoid pores larger than the primary particle size, the particles should be discreet, rather than attached together in agglomerated clusters. Agglomerated clusters often produce low-density green ceramics and leave numerous large pores after sintering. Finally, it is important that the ceramic powder be free of contaminants to insure purity of the resulting high technology ceramic.

One known method of preparing powder formulations used in high technology ceramics involves the calcination of a mechanically ground mixture of metal oxides and/or carbonates in definite proportions. The milling and grinding introduces contaminants from abrasive materials which have a detrimental effect on the desirable properties and introduce a variance into each batch of powder prepared. In addition, the mechanically ground mixture requires prolonged calcination at high temperatures which promotes crystallite coarsening, an undesirable consequence in the fabrication of dense fine grain ceramics. U.S. Pat. No. 3,330,697 teaches a process for preparing lead and alkaline earth titanates and niobates from resin intermediates made from alpha-hydroxycarboxylic acids, such as citric acid, in which a hydrated oxide or alkoxide and an alpha-hydroxycarboxylate of titanium, niobium, and zirconium is mixed with citric acid in a polyhydroxy alcohol which is liquid below about 100° C., dissolving therein at least one basic one metal compound from the group of oxide, hydroxide, carbonate and alkoxide of lead and the alkaline earth metals, and calcining the composition to remove the organic constituents. The resulting product includes agglomerated particles which require grinding after calcination. In addition, particle size is very difficult to control by this method.

Similarly, Chick, L. A. et al., "Synthesis of Air-Sinterable Lanthanum Chromite Powders", *Proceedings of the First International Symposium on Solid Oxide Fuel Cells*, vol. 89-11, pgs. 171–187, teaches a process for synthesizing lanthanum chromites in which metal nitrates and glycine or some other low molecular weight amino acid are dissolved in water and the resulting solution is boiled down until it thickens and ignites, producing ash that contains the oxide product. Thereafter, the oxide product is calcined, sonicated and dry pressed. This process too produces agglomerates which require grinding after calcination, thereby introducing contaminants into the ceramic powder. In addition, particle size is very difficult to control.

Numerous methods for preparing porous ceramic materials having particular physical and chemical properties are disclosed by the prior art. One such approach is disclosed by U.S. Pat. No. 2,918,392, U.S. Pat. No. 4,004,933, U.S. Pat. No. 3,907,579, U.S. Pat. No. 3,833,386, and U.S. Pat. No. 4,559,244 in which a foam or porous solid body is impregnated with a material for deposit on the surfaces of the foam or porous body and subsequently treated, for example sintered, to produce porous ceramic or ceramic coated materials. U.S. Pat. No. 3,649,354 teaches a method for producing electrically operated devices in which a liquid electrically insulating filler material, such as polyurethane, is applied to a layer of electrically active grains and allowed to contract, thus exposing the peaks of the grains, after which it is allowed to harden. U.S. Pat. No. 4,572,843 teaches a method for producing a capacitor in which an insulating composition, such as an organic polymeric compound containing a metal powder or an organometallic compound as a metal source is formed on a dielectric layer formed on an electrode, the insulating composition being heated to form a second conductive electrode.

With a somewhat different approach, U.S. Pat. No. 3,497,455 teaches a method for producing foam metallic oxides in which an aqueous solution of a metal salt (nitrate) is mixed with a frothing agent to form a noncollapsing foam, and subsequently heated up to about 3000° F. to form the porous product.

Numerous other methods for preparing ceramic structures from ceramic powders are also disclosed by the prior art. U.S. Pat. No. 4,957,673 teaches a method for producing unitary layered ceramic structures having cosintered layers for use in fuel cells, such as tapes having a center layer of yttria-stabilized zirconia sandwiched between outer layers of strontium doped lanthanum manganite. U.S. Pat. No. 2,108,995 teaches an anode of film forming material and a cooperating cathode spaced by a sheet of a flexible nonfibrous albuminous sheet material which has been impregnated and made electrically conductive by the addition of a conductive electrolyte, such as ethylene glycol and citric acid. Similarly, U.S. Pat. No. 2,158,981 teaches an electrolytic condenser having a highly viscous or pasty electrolyte where the electrolyte is, for example, citric acid and ethylene glycol.

U.S. Pat. No. 3,180,741 teaches a method for producing solid products from liquid polymers with polyvalent metallic salts using a mono- or polycarboxylic acid. U.S. Pat. No. 3,386,856 teaches a method for manufacturing a device consisting mainly of oxidic dielectric material in which the device is provided with electrodes and at least one of the surfaces of the device on which the electrodes are provided is superficially oxidized until an insulating junction layer is formed.

U.S. Pat. No. 3,427,195 teaches a process for producing an electrolytic condenser in which a metal foil is coated with a liquid film of water soluble nitrates or oxalates and finally suspended particles of a water insoluble refractory compound and heated to produce an electrically insulating refractory oxide which, together with a refractory compound, forms the separator coating on the metal foil.

Various methods for preparing dielectric ceramic powders are also taught by the prior art including U.S. Pat. No.

3,647,364 which teaches a process for preparing high purity, submicron, dielectric ceramic powders using alcoholates; U.S. Pat. No. 3,965,046 which teaches a process for making metal bearing powders from organometallic salt seeds; U.S. Pat. No. 4,004,917 which teaches a process for producing acicular metallic powders from organometallic salts by precipitation or growth of the salt in the presence of complexing agent; similarly, U.S. Pat. No. 4,146,504 which teaches a process for producing structures formed from powders of high porosity made using organometallic salts and glycol; U.S. Pat. No. 4,751,070 which teaches a method for synthesizing submicron particles of ceramic or metallic materials at very low temperatures in which a nitrate source is combined with an inorganic reducing fuel to provide a chemical precursor for the particular ceramic or metallic material, which precursor is exothermically decomposed in a controlled atmosphere at a temperature of about 200° C. below the endothermic decomposition temperature of the nitrate source; U.S. Pat. No. 4,757,037 in which a suspension formed from a mixture of a solution of titania containing elementary crystallites of titanium oxide and a solution of neodymium nitrate or a solution of barium and neodymium nitrates is dried to obtain a dried product and calcined at a temperature of 800° to 1300° C. to obtain an ultrafine dielectric powder; U.S. Pat. No. 4,800,051 which teaches a method for ceramic fabrication involving hydrolyzing a suitable metal alkoxide to form a slurry, drying the metal oxide powder in the slurry, granulating and calcining the metal oxide powder, ballmilling the calcined metal oxide powder as a slurry to maximize powder dispersion in the solution, compacting the dispersed powder from the ballmilled slurry into a powder compact, drying the powder compact and sintering the powder compact at a suitable relatively low sintering temperature; U.S. Pat. No. 4,845,056 in which a solution of ceramic oxides or hydrous oxides is continuously pressurized and heated to in excess of the critical temperature and pressure of the solution solvent, transforming the solvent to a gas and subsequently separating it from the fine particulate ceramic oxide powder; and U.S. Pat. No. 4,141,763 in which a stream of an aqueous solution of metal salt and a solution containing a reducing material are injected into a uniformly applied magnetic field from nozzles and immediately mixed as they impinge on one another in the form of sprays to cause a reaction between them. However, none of the prior art teaches a method for preparing uniform, agglomerate free submicron/nanosize ceramic powders by incorporating a precursor solution within a polymeric foam.

SUMMARY OF THE INVENTION

It is an object of this invention to produce submicron/nanosize ceramic powders.

It is another object of this invention to produce submicron/nanosize ceramic powders without introducing impurities into the powders.

It is another object of this invention to provide a process for preparing submicron/nanosize ceramic powders which does not require grinding of the powder after calcination.

It is another object of this invention to provide a process for preparing submicron/nanosize ceramic powders in which the conditions for preparation are not critical to the resulting ceramic powders.

It is yet another object of this invention to provide a process for preparing submicron/nanosize ceramic/metal powders which is essentially independent of the chemical composition of the ceramic/metal powders to be synthesized and which is particularly well suited for synthesizing ceramic oxides.

It is yet another object of this invention to provide a process for preparing submicron/nanosize ceramic/metal powders which can be sintered at temperatures typically a few hundred degrees centigrade lower than powders prepared in accordance with the teachings of the prior art.

It is yet another object of this invention to produce ceramic powders which are free of agglomerates and uniform in size.

It is another object of this invention to provide a process for preparing submicron/nanosize ceramic powders in which dopants are easily added and stoichiometry is easily controlled.

It is yet another object of this invention to provide a generic, low-cost process for producing high purity, submicron size, single or multi-component ceramic oxide powders.

It is yet another object of this invention to produce ceramic powders which are chemically uniform.

These and other objects are achieved in accordance with this invention in a process for producing ceramic powders in which a polymeric foam comprising metal cations or a mixture of metal cations and metal oxides homogeneously incorporated within a foam cell structure of the polymeric foam is calcined in an atmosphere conducive to the removal of the polymeric foam at the lowest temperature and least amount of time required for complete removal of all organics and the formation of the desired crystal phase, preferably, at a calcination temperature of about 400° C. to about 1400° C. for about 1 minute to about 96 hours, producing an oxide powder or a metal powder. Metal oxides used in this process must be nanosize particles in order to produce the desired nanosize powders. If metal powders are desired from the oxide powders produced in accordance with this process, the oxide powders can be reduced to form the desired metal powders. In addition, metal powders produced in accordance with this process which have a tendency to oxidize upon cooling may be cooled in a reducing atmosphere to prevent oxidation. The powders produced in accordance with this process are high purity, uniform, agglomerate-free, submicron or nanometer size, single or multicomponent ceramic/metal powders. Powders produced in accordance with this process range in size from about 2 nanometers to about 0.99 microns.

Metal cations suitable for use in accordance with the process of this invention comprise lanthanum, strontium, chromium, zirconium, yttrium, aluminum, lithium, iron, antimony, boron, cadmium, cesium, dysprosium, erbium, europium, gold, hafnium, holmium, iridium, lutetium, mercury, molybdenum, niobium, osmium, palladium, platinum, praseodymium, rhenium, rhodium, rubidium, ruthenium, samarium, scandium, sodium, tantalum, terbium, thorium, thulium, tin, titanium, tungsten, uranium, vanadium, ytterbium, and mixtures thereof.

By the term "foam", as used in the specification and claims, we mean a material having a porosity between about 66% and 99.95%, the porosity being the void space within the foam structure.

In accordance with one embodiment of the process of this invention, metal cation salts of the desired ceramic/metal composition are dissolved in a solvent system, such as water, acetone, alcohol or other solvent selected according to its ability to dissolve the metal salts and for its compatibility with the chemicals used to produce the polymeric foam. The metal cation solution is then homogeneously mixed with the organic precursors used to produce the polymeric foam. In a preferred embodiment of this invention, the polymeric foam is polyurethane foam and the metal cation solution is homogeneously mixed with the hydroxyl containing component of the components for producing the polyurethane foam, at a ratio determined from the polymerization reaction. The resulting chemical solution is then mixed with the other chemical component needed to produce the polyurethane foam at a predetermined ratio. The chemical mixture at this stage starts to foam almost immediately at room temperature. Hardening occurs during and after the foaming is completed producing metal cations homogeneously incorporated within the vastly expanded, low density polyurethane foam cell structure. The hardened foams are then heated above the decomposition temperatures of both the foam and the metal cation salts to form oxide powders of high purity, uniform, nonagglomerated, submicron/nanometer size particles.

Suitable metal cation salts in accordance with this embodiment of this invention are salts which are soluble in a solvent which is compatible with the chemicals used to produce the polymeric foam, such as, chlorides, carbonates, hydroxides, isopropoxides, nitrates, acetates, oxalates, epoxides and mixtures thereof. To be compatible with the chemicals used to produce the polymeric foam, the solvent must not interfere with or destroy the foaming process and/or the polymerization process. It is also preferred that the solvent be completely miscible with one or the other of the chemicals used to produce the polymeric foam.

In accordance with another embodiment of the process of this invention, the metal cations are homogeneously incorporated within the foam cell structure of the polymeric foam by mixing an organic precursor of the polymeric foam with at least one metal cation salt or a mixture of at least one metal cation salt and at least one metal oxide in a suspension, producing the desired foam mixture, and hardening the foam mixture.

In accordance with another embodiment of the process of this invention, a polymeric foam is impregnated with a polymeric precursor solution. The impregnated polymeric foam is heated at a temperature between about 80° C. to about 150° C. to remove the solvent and the solvent-free impregnated polymeric foam is subsequently calcined at a temperature of about 400° C. to about 1400° C. for about 1 minute to about 96 hours. The calcination time is based on the crystalline structure desired for the final product, some crystalline structures requiring longer calcination times than others. The polymeric precursor solution in accordance with this embodiment of this invention comprises an alpha-hydrocarboxylic acid, a polyhydroxyalcohol and at least one metal cation salt. The alpha-hydrocarboxylic acid and the polyhydroxyalcohol form a polymeric resin, the type and amount of which depends on the metal cation salt selected. A solvent, preferably water, is used to dissolve the metal cation salts and polymeric resin to form a solution.

Using a polymeric foam, such as a polyurethane foam, provides support for the metal cations or polymeric precursor solution so that the metal cations are dispersed within the foam cell structure. In accordance with one embodiment of this invention, the physical characteristics of the polymeric foam skeleton, such as density, pore size, and pore shape, can be used as a supplemental control for the particle size and morphology of the ceramic powder. Primary control over particle size and morphology is determined by the amount of solvent used to dissolve the cation salts and polymeric resin. Powders produced in accordance with one embodiment of the process of this invention have generally uniform particle sizes between about 5 nanometers up to about 300 nanometers, have no agglomerates and thus require no grinding after calcination, and do not contain significant impurities introduced by the process.

In accordance with yet another embodiment of this invention, the polymeric foam comprising the metal cations homogeneously incorporated within the foam cell structure is produced by mixing an aqueous solution comprising at least one metal cation salt or a mixture of at least one metal cation salt and at least one metal oxide with an organic binder and a surfactant producing a metal salt/organic binder/surfactant mixture, generating bubbles within the metal salt/organic binder/surfactant mixture to form a wet foam structure, and drying the wet foam structure to produce a hardened foam cell structure. During destruction of the foam material by calcination, the organic binder must decompose at a temperature below its melting temperature.

These and other objects and features of this invention will be more readily understood and appreciated from the following detailed description.

DESCRIPTION OF PREFERRED EMBODIMENTS

In the process in accordance with this invention, a polymeric foam, such as polyurethane foam which is known by the inventors to produce favorable results, comprising metal cations or a metal cation/metal oxide mixture homogeneously incorporated within the foam cell structure of the polymeric foam is calcined in an atmosphere conducive to the removal of the polymeric foam, such as air, at a calcination temperature of about 400° C. to about 1400° C. for about 1 minute to about 96 hours. In accordance with a preferred embodiment of this invention in which the polymeric foam is polyurethane foam, a metal cation solution having the desired ceramic/metal composition is mixed with one of the chemical components used for producing the polyurethane foam, preferably the hydroxyl containing component. The process of urethane foaming and hardening proceeds in the same way as in the urethane reaction by adding and mixing the hydroxyl containing component with an appropriate amount of the isocyanate containing component. After foaming and hardening, the metal cations are homogeneously incorporated within the vastly expanded, low density polyurethane foam cell structure.

Various metal cation salts can be used, such as chlorides, carbonates, hydroxides, isopropoxides, nitrates, acetates, epoxides, oxalates, and mixtures thereof. The type of metal cation salts used are selected on the basis of solubility, preferably having high solubility in a solvent system which is compatible with the compounds used for producing the polyurethane foam. Additional considerations for selecting the cation salts may include low temperature decomposition of the metal salts, environmentally safe composition of the metal salts, and low cost.

Solvent systems which may be used to dissolve the metal salts comprise water, acetone, and alcohols. The preferred solvent system is selected on the basis of its ability to dissolve the desired metal salts and for its compatibility, as previously described, with the compounds used to produce the polyurethane foam. The preferred solvent is water which can dissolve a wide variety of metal salts, which is compatible with polyurethane making compounds, which is cheap, and which is environmentally safe.

Polyurethanes are addition polymers formed by the exothermic reaction of di- or poly-isocyanates with polyols in accordance with the following general reaction:

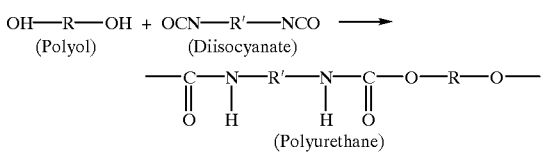

After reaction with the polyols, the next most important reaction of isocyanates is with water to yield a substituted urea and carbon dioxide which provides the principal source of gas for blowing in the forming of low density foams. This reaction proceeds in accordance with the following general formula:

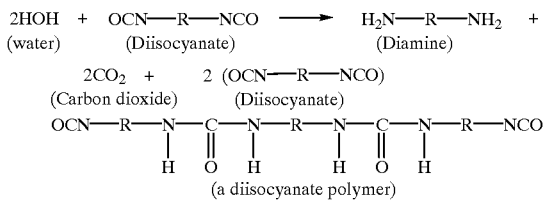

It is important to note that water in the system in accordance with this embodiment of the invention is utilized in the polymerization reactions and, thus, may not have to be removed by an extra drying process.

To promote the chemical reaction and permit better control of the foam structure, other chemicals, such as surfactants and catalysts, may be added. If high purity ceramic/metal powders are desired, then additives containing only organic substances are preferred to avoid the introduction of impurities.

In accordance with another preferred embodiment of this invention, polyurethane foam is impregnated with a polymeric precursor solution comprising a polymeric resin and at least one cation salt. A polymeric resin known to be effective in accordance with this embodiment of the process of this invention is a mixture of citric acid and ethylene glycol. The polymeric resin is mixed with at least one cation salt dissolved in a solvent, preferably water, to form a polymeric precursor solution. Impregnation of the polymeric foam can be accomplished in any number of ways, including simply soaking the polymeric foam in the polymeric precursor solution. The impregnated polymeric foam is heated at a temperature between about 80° C. to about 150° C. in a desired atmosphere, preferably air, to drive off the solvent and form dry foam. Following drying, the foam is calcined in a furnace at temperatures between about 400° C. to about 1400° C. for a period of about 1 minute to about 96 hours, depending on the nature of the ceramic powder and ceramic precursor under preparation and on the particle size desired, in an atmosphere that allows a complete removal of the polymer and decomposition of cation salts. A typical heating rate in accordance with one embodiment of the process of this invention is 4° C. per minute in a flow of air. Ceramic powders obtained after calcination are typically well crystallized, extremely fine and agglomerate-free, requiring no further grinding before being processed and sintered to the desired form.

EXAMPLE I

This example describes a process for preparing a highly air sinterable $La_{0.78}Sr_{0.22}CrO_{3-y}$ (LSC) powder having nanometer size particles which can be used to produce interconnects for a solid oxide fuel cell. High purity nitrates, $La(NO_3)_3 \cdot 6H_2O$, $Sr(NO_3)_2$ and $Cr(NO_3)_3 \cdot 9H_2O$ were used as the starting materials. Appropriate amounts totalling 50 grams of the nitrates were weighed and dissolved in distilled water, approximately 30 grams, in a 600 milliliter glass beaker. The metal solution was mixed with 200 milliliters of a mixture of polyols, organic surfactants and catalysts for approximately five minutes. 200 milliliters of a polymeric isocyanate were then added to the chemical solution and mixed for one minute. The resulting chemical was quickly transferred to two 2 L sized porcelain dishes. Foaming occurred almost immediately and the foam expanded to its maximum volume after approximately one-half hour. Hardening was completed in about 40 minutes. By heating at approximately 50° C. to 100° C., the time required for foaming and hardening can be reduced.

The hardened foam was then fired at 750° C., in air, using a heating rate of approximately 5° C. per minute and a soaking time of five hours. After the, firing, the LSC powder obtained was found to be single phase by x-ray powder diffraction. High resolution SEM showed that the LSC powder had a typical particle size of about 20 nanometers. The powder was essentially nonagglomerated and uniform in size.

Subsequently, the LSC powder was compacted into a pellet at approximately 130 MPa and sintered in air at 1400° C. for approximately two hours to produce a sample having 96 percent of theoretical density. This is compared to LSC powder prepared using known powder processing methods which produce powders having a particle size of about 1 micron. As a consequence of the larger particle sizes, the powders prepared using the known methods require a sintering temperature of about 1700° C. under reducing atmosphere conditions to obtain a similar density.

EXAMPLE II

This example demonstrates a process for preparing nanometer size 8 mole percent $Y_2O_3$ stabilized $ZrO_2$ (YSZ), which is used in structural ceramics, sensors, and electrolytes in solid oxide fuel cells.

The starting materials used were $ZrO(NO_3)_3 \cdot xH_2O$ and $Y(NO_3)_3 \cdot 5H_2O$. About 50 grams of the nitrates, in a stoichiometric ratio required to obtain $Zr_{0.84}Y_{0.16}O_{1.92}$, were dissolved in approximately 40 grams of distilled water. The nitrate solution was mixed in a 600 milliliter glass beaker with a mixture of polyols, organic surfactants and catalysts for approximately five minutes. Polymeric isocyanates were added to the mixture and mixed for approximately one minute and the resulting chemical mixture was transferred to two 2 L size porcelain dishes where foaming rapidly occurred. The foam hardened after about thirty minutes and was fired at 750° C., in air, for five hours. The powder thus obtained exhibited a single cubic phase of YSZ as shown by x-ray powder diffraction. BET study showed that the YSZ powder had a surface area of 96 meters squared per gram. TEM studies showed that the powder had a particle size of about 10 nanometers.

The powder was subsequently die pressed at about 130 MPa and sintered at 1250° C. for one minute. A density of about 90 percent of the theoretical value was obtained. When sintered at 1350° C., ceramics close to the theoretical density, approximately 96 percent of theoretical density, were obtained.

EXAMPLE III

In a modification to the procedure described in Example II, the solvent system used contained ethanol and acetone in a one to one ratio. All preparative procedures were similar to the procedure described in Example II above. A BET surface area of 104 square meters per gram was measured and TEM micrographs showed particle sizes of about 10 nanometers.

EXAMPLE IV

This example demonstrates a process for preparing nanometer size $Al_2O_3$ which is widely used as a structural ceramic.

The starting material used was $Al(NO_3)_3.9H_2O$. About 50 grams of the nitrate were dissolved in approximately 40 grams of distilled water. The nitrate solution was mixed in a 600 milliliter glass beaker with a mixture (about 150 grams) of polyols, organic surfactants and catalysts for approximately five minutes. Polymeric isocyanates (about 150 grams) were added to the mixture and mixed for approximately one minute and the resulting chemical mixture was transferred to two 2 L size porcelain dishes where foaming rapidly occurred. The foam hardened after about 30 minutes and was fired at 750° C., in air, for 3 hours. The powder thus obtained has a BET surface area of about 118 $m^2$/grams. This corresponds to an average particle diameter of about 13 nm.

EXAMPLE V

This example demonstrates a process for preparing uniform, submicron $LiFeO_2$ powder as an electrode material for use in a molten carbonate fuel cell.

The starting materials used were $LiNO_3$ and $Fe(NO_3)_3.9H_2O$. About 50 grams of the nitrates were dissolved in approximately 35 grams of distilled water. The nitrate solution was mixed in a 600 milliliter glass beaker with a mixture (about 150 grams) of polyols, organic surfactants and catalysts for approximately five minutes. Polymeric isocyanates (about 150 grams) were added to the mixture and mixed for approximately one minute and the resulting chemical mixture was transferred to two 2 L size porcelain dishes where foaming rapidly occurred. The foam hardened after about 30 minutes and was fired at 750° C., in air, for 3 hours. The powder thus obtained has a BET surface area of about 3.8 $m^2$/grams. This corresponds to an average particle diameter of about 0.36 micron. An average particle size of about 0.3 to 0.4 micron was observed using SEM.

EXAMPLE VI

This example describes a process for preparing a submicron, nonagglomerated and highly air sinterable $La_{0.78}Sr_{0.22}CrO_{3-y}$ powder which can be used to produce interconnects for solid oxide fuel cells. An appropriate amount of high purity nitrates $La(NO_3)_3.6H_2O$, $Sr(NO_3)_2$ and $Cr(NO_3)_3.9H_2O$ were weighed and dissolved in distilled water. The nitrates to water ratio was 1:1 by weight. Citric acid was also dissolved in a small amount of water, mixed with ethylene glycol and finally added to the nitrate solution to obtain a polymeric precursor solution of $La(Sr)CrO_3$. Approximately 30 grams of the polymeric resin having a 1:1 mole ratio of citric acid to ethylene glycol were used for every 0.05 moles of the nitrates. Polyurethane foam was cut into approximately 2 inch by approximately. 2 inch by approximately 2 inch cubes which were fully soaked with the precursor solution. After allowing excess precursor solution to drip off, the foam cubes were placed in an oven and dried at 100° C. for twelve hours. Subsequently, the foam cubes containing the dried precursor were calcined for two hours in a flow of air at 750° C. with a heating rate of 4° C. per minute. The resulting powder has an average particle size of about 0.1 microns as observed under SEM. X-ray diffraction shows a single phase of LSC.

Sample pellets of the resulting powder, 12.7 millimeters in diameter and 2 millimeters thick, were obtained by die pressing at about 130 MPa. A green density of about 50 percent of the theoretical was obtained. Sintering was carried out at various temperatures from 1400° to 1600° C. in air for six hours with a heating rate of 20° C. per minute. The final densities of the samples were measured using the water immersion method with the following results:

TABLE

| Sintering Temperature | Relative Density |
|---|---|
| 1600° C. | 96% |
| 1500° C. | 94% |
| 1400° C. | 92% |

As shown, the lanthanum strontium chromate powder prepared using this embodiment of the process of this invention can be sintered to a density, of about 92 percent at 1400° C. in air. In contrast thereto, a lanthanum strontium chromate powder prepared from the same polymeric precursor solution without a foam skeleton support during drying and calcination can only be sintered to less than 80 percent density at 1600° C.

EXAMPLE VII

This example describes the preparation of nanometer size yttrium oxide in accordance with one embodiment of the process of this invention. Approximately 30 grams of yttrium nitrate ($Y(NO_3)_3.5H_2O$) were combined with about 100 grams of deionized water in a Pyrex beaker. The solution was next stirred while heating to approximately 90° C. until all the material had dissolved. To the nitrate solution was next added about 200 ml. of a mixture of polyols and organic catalysts. The mixture was thoroughly mixed by stirring with an impeller stirrer while heating to about 90° C. The polymeric solution was heated in order to facilitate the foam forming reaction which begins upon addition of the isocyanates. Next, about 200 ml. of polymeric isocyanates were added to the nitrate-polyols mixture. The precursor then obtained was mixed vigorously with a stirrer. Foaming occurred in about 30 seconds and the foam hardened in about 20 minutes.

The polyurethane foam with yttrium cations dispersed in its skeleton cell structure was then heat treated at 700° C. with a heating rate of 8° C./min and dwelling time of 2 hours. During the heat treatment, all organic substances were removed and extremely fine powder of $Y_2O_3$ was obtained having a 37 $m^2$/g surface area.

EXAMPLE VIII

This example describes the preparation of nanometer size $BaCe_{0.8}Gd_{0.2}O_y$ in accordance with one embodiment of the process of this invention. Gadolinium-doped barium cerate is used as an electrolytic material for intermediate temperature solid oxide fuel cells. The starting metal nitrates used were $Ba(NO_3)_2$, $Ce(NO_3)_4.6H_2O$ and $Gd(NO_3)_3.5H_2O$. Approximately 30 g total of nitrates were mixed with about 100 g water in a ratio to, yield the above stoichiometry. The experimental procedure according to Example VII was used to yield the desired oxide powder.

EXAMPLE IX

This example describes the preparation of nanometer size $BaCe_{0.8}Nd_{0.2}O_y$ powder in accordance with the process of this invention. Neodymium doped barium cerate is used as a protonic conductor. The starting metal nitrates used were $Ba(NO_3)_2$, $Ce(NO_3)_4 \cdot 6H_2O$ and $Nd(NO_3)_3 \cdot 6H_2O$. Approximately 30 g total of the following nitrates were mixed with about 100 g water in a ratio to yield the above stoichiometry. The experimental procedure according to Example VII was used to yield the above mentioned oxide powder.

EXAMPLE X

This example describes the preparation of nanometer size doped ZnO powder in accordance with the process of this invention. Doped ZnO powder is used by the electronic industry to fabricate varistors. Approximately 20 grams of nitrates and acetates were dissolved in about 100 grams of deionized water in a 500 ml. Pyrex beaker. The nitrates and acetates used were added in a ratio needed to yield 97 mol % ZnO, and 0.5 mol % of each of the following oxides: chrome oxide, bismuth oxide, cobalt oxide, and manganese oxide. All were added as nitrates except for cobalt which was added as an acetate. Next, an equivalent of 1 mol % antimony oxide was dissolved in 20 g glacial acetic acid in the form of antimony acetate. The acetic acid solution was next added to about 200 g of polyglycol and impeller stirred. Next, the water/nitrate/acetate solution was added to the polyglycol solution and again impeller stirred for five minutes. Next, about 200 ml. of polymeric isocyanates were added to the polyols mixture. The precursor obtained was mixed vigorously with a stirrer. Foaming occurred in about 30 seconds and the foam hardened in about 20 minutes.

The polyurethane foam with cations dispersed in its skeleton cell structure was then heat treated at 700° C. with a heating rate of 8° C./min and dwelling time of 2 hours. During the heat treatment, all organic substances were removed and extremely fine powder was obtained.

EXAMPLE XI

This example describes the preparation of nanometer size $CuO \cdot Cr_2O_3 \cdot Al_2O_3$ powder in accordance with the process of this invention. This particular composition is used as catalyst type material. Approximately 5.6 grams of copper nitrate, 20 g of chrome nitrate and 54.4 grams of aluminum nitrate were combined with about 75 grams of deionized water in a Pyrex beaker. The experimental procedure according to Example VII was used to yield the desired oxide powder. However, 600 grams of polyol and 600 grams of the isocyanates were used instead of the 200 grams reported for Example VII. The above process yielded 13 g of powder with a surface area of 81 $m^2/g$.

EXAMPLE XII

This example describes the preparation of nanometer size $CuO \cdot Cr_2O_3 \cdot ZrO_2$ powder. This particular composition is used as catalyst type material. The same procedures as Example XI were employed except for the replacement of 54.4 grams aluminum nitrate with 30.3 grams of zirconium nitrate.

EXAMPLE XIII

This example describes the preparation of nanometer size mullite type powder in accordance with one embodiment of the process of this invention in which the metal cations are mixed with a metal oxide in a suspension. Mullite has many applications, one of which is for structural support. This process is distinct from previously disclosed examples in that one of the starting materials is an insoluble oxide and not a soluble metal salt. 10 g of a solution containing 28.1 wt % nanometer size $SiO_2$ particles in a water suspension were added to 200 ml of a polyglycol which was next impeller stirred for five minutes. Next, 53 g of aluminum nitrate were dissolved in 50 grams of water and added to the polyglycol mixture. The mixture was next stirred for another five minutes. About 200 ml. of polymeric isocyanates were then added to the nitrate-polyols mixture. The precursor then obtained was mixed vigorously with a stirrer. Foaming occurred in about 30 seconds and the foam hardened in about 20 minutes.

The heat treatment was the same as used in Example VII to yield an amorphous powder with a surface area of 198 $m^2/g$. Mullite crystallization was found to occur at temperatures between 1000° C. to 1200° C.

EXAMPLE XIV

This example illustrates the preparation of nanometer size NiO powder. The starting material for this example was nickel acetate. The experimental procedure according to Example VII was used to yield NiO powder.

EXAMPLE XV

This example describes the preparation of nanometer size $MgO \cdot K_2CO_3$ with a Mg/K ratio of 6:1. $MgO \cdot K_2CO_3$ is a possible candidate for $CO_2$ absorbance. Approximately 94 grams of magnesium nitrate were combined with 6 grams of potassium nitrate and 65 g of deionized water in a Pyrex beaker. The solution was stirred until all the material had dissolved. To the nitrate solution was added about 600 ml of a mixture of polyols and organic catalysts. The mixture was thoroughly mixed by stirring with an impeller stirrer while heating to about 90° C. The polymeric solution was heated in order to facilitate the foam forming reaction which begins upon addition of the isocyanates. Next, about 600 ml. of polymeric isocyanates were added to the nitrate-polyols mixture. The precursor then obtained was mixed vigorously with a stirrer. Foaming occurred in about 30 seconds and the foam hardened in about 10 minutes.

The polyurethane foam with magnesium and potassium cations dispersed in its skeleton cell structure was then heat treated at 700° C. with a heating rate of 8° C./min and dwelling time of 4 hours. During the heat treatment, all organic substances were removed and extremely fine powder was obtained having a 30 $m^2/g$ surface area.

EXAMPLE XVI

This example describes the preparation of nanometer size $LaMn_{0.8}Sr_{0.2}O_{3-y}$ powder. Strontium doped lanthanum manganite is used as an electrode material in electrochemical cells. The starting metal nitrates used were $La(NO_3)_3 \cdot 6H_2O$, $Mn(NO_3)_2 \cdot 6H_2O$ and $Sr(NO_3)_2$. Approximately 65 g total of nitrates were mixed with about 100 g water in a ratio to yield the above stoichiometry. The mixture was thoroughly mixed by stirring with an impeller stirrer while heating to about 90° C. To the nitrate solution was added about 600 ml of a mixture of polyols and organic catalysts. The polymeric solution was heated in order to facilitate the foam forming reaction which begins upon addition of the isocyanates. Next, about 600 ml. of polymeric isocyanates were added to the nitrate-polyols mixture. The precursor then obtained was mixed vigorously with a stirrer. Foaming occurred in about 90 seconds and the foam hardened in about 20 minutes.

The polyurethane foam with cations dispersed in its skeleton cell structure was then heat treated at 700° C. with a heating rate of 8° C./min and dwelling time of 2 hours. During the heat treatment, all organic substances were removed and extremely fine powder was obtained.

EXAMPLE XVII

This example describes the preparation of nanometer size iron oxide powder. Iron oxide is used, among other things, as a catalyst material for coal liquefaction. The starting metal nitrate used was $Fe(NO_3)_3.9H_2O$. Approximately 50 g of iron nitrate were mixed with about 100 g water. The mixture was thoroughly mixed by stirring with an impeller stirrer while heating to about 90° C. To the nitrate solution was added about 600 ml of a mixture of polyols and organic catalysts. The polymeric solution was heated in order to facilitate the foam forming reaction which begins upon addition of the isocyanates. Next, about 600 ml. of polymeric isocyanates were added to the nitrate-polyols mixture. The precursor then obtained was mixed vigorously with a stirrer. Foaming occurred in about 150 seconds and the foam hardened in about 20 minutes.

The polyurethane foam with cations dispersed in its skeleton cell structure was then heat treated at 650° C. with a heating rate of 4° C./min and dwelling time of 3 hours. During the heat treatment, all organic substances were removed and extremely fine powder was obtained.

In accordance with another embodiment of the process of this invention, the polymeric foam comprising metal cations homogeneously incorporated within the foam cell structure is produced by mixing an aqueous solution comprising at least one metal cation salt with an organic binder, that is, an organic polymer, and a surfactant. The resulting mixture is aerated to produce air bubbles within the mixture, forming a wet foam structure. The wet foam structure is then dried to produce an hardened polymeric foam with metal cations incorporated within the foam cell structure. The resulting foam cell structure is then heat treated to produce the desired submicron powders.

To ensure the formation of a powder during the heat treating process, it is critical that the organic binder have a decomposition temperature which is lower than its melting temperature. Another requirement of an organic binder suitable for use in this process is one which is soluble in some solvent, preferable water.

A significant feature of the process for producing submicron oxide powders in accordance with this embodiment of the invention is the generation of a stable foam structure with no chemical reactions occurring during the wet stages. In particular, the surfactant, preferably a foaming surfactant, when mixed with the organic binder stabilizes the foam which is created by whipping (stirring), by direct introduction of air into the solution or by boiling of the solution mixture. The preferred surfactant is an organic surfactant having very low metal content or, alternatively, a metal content which does not add to impurities in the final powder. Thus, for example, a silicon surfactant is acceptable if the desired powder is a silicon based powder. To maintain the bubbles within the solution and to minimize cation segregation, it is also desirable that the solution have a suitable viscosity, preferably between about 100 to 300,000 centipoise.

EXAMPLE XVIII 20 grams of nickel nitrate were added to 50 grams of water, the resulting solution being stirred and heated to boiling. Immediately after reaching boiling, 1.0 grams of an organic binder, Methocel K100M, and 1.5 grams of an organic surfactant, Texaco M150, were added to the nitrate solution. The solution mixture was stirred for 3 minutes with a stirrer. The glass beaker containing the solution was then placed in cold water at which time air bubbles were blown through a porous glass frit tube submerged in the solution, creating a thick wet foam structure with many air bubbles. The foam structure was then divided into two parts. The first part was heated in an oven to 300° C. at a heating rate of about 15° C. per minute with a six minute hold. The second part was placed in a drying oven at 90° C. and left overnight to dry. Both of the dried nickel nitrate foams were then calcined in air at 650° C. for 1 hour at a heating rate of 10° C. per minute. The resulting NiO powder had a surface area of about 4 and 5 m,/g, respectively, which corresponds to an average particle size of about 0.23 microns and 0.16 microns in diameter, respectively.

EXAMPLE XIX

This example describes a process for preparing nanometer size $CuO.Cr_2O_3.Al_2O_3$ powder of slightly different composition than that produced in Example XI. This particular composition is used as a catalyst type material. Approximately 8.7 grams of copper nitrate, 14.5 g of chrome nitrate and 54.4 grams of aluminum nitrate were combined with about 70 grams of deionized water in a Pyrex beaker. The experimental procedure according to Example XI was then followed to yield the desired oxide powder. 600 grams of polyol and 600 grams of the isocyanates were used. The above process yielded powder with a surface area of 67 $m^2/g$.

EXAMPLE XX

This example describes a process for preparing nanometer size pure zirconium oxide. Approximately 20 grams of zirconium nitrate were combined with about 50 grams of deionized water in a Pyrex beaker. The solution was stirred while heating to approximately 90° C. until all the material had dissolved. To the nitrate solution was added about 100 ml of a mixture of polyols and organic catalyst. The mixture was thoroughly mixed by stirring with an impeller stirrer while heating to about 90° C. The solution was heated to facilitate the foam forming reaction which begins upon addition of the isocyanates. Next, about 100 ml of polymeric isocyanates were added to the nitrate-polyols mixture. The precursor then obtained was mixed vigorously with a stirrer. Foaming occurred in about 4 minutes and the foam hardened in about 25 minutes.

The polyurethane foam with zirconium cations dispersed in its skeleton cell structure was then heat treated at 700° C. with a heating rate of 8° C./min and dwelling time of 2 hours. During the heat treatment, all organic substances were removed and extremely fine powder of $ZrO_2$ was obtained.

EXAMPLE XXI

This example illustrates the preparation of submicron size ZnO powder. ZnO is used in varistors for the electronic industry. The starting metal nitrate used was $Zn(NO_3)_2.6H_2O$. Approximately 20 g of nitrate were dissolved in about 50 g water. The solution was heated to boiling while mixing. Next 1.0 g of Methocel K100M was added to the solution along with 1.5 g of Texaco N150 as a foam stabilizing agent. The solution was placed in a drying oven at 120° C. which resulted in boiling of the solution and a stabilized dry foam with zinc cations incorporated in its cell structure was obtained. The foam was next heated at 5° C./min to 700° C.

with a 6 minute hold time. This heat treatment removed all organic material. The resulting ZnO powder had a surface area of 3.1 m$^2$/g.

EXAMPLE XXII

This example describes the preparation of nanometer size YBa$_2$Cu$_3$O$_{7-y}$ powder. This material is used to make superconductors. The starting metal nitrates used were Ba(NO$_3$)$_2$, Cu(NO$_3$)$_2$.3H$_2$O and Y(NO$_3$)$_3$.5H$_2$O. Approximately 15 g total of the nitrates were mixed with about 40 g water in a ratio to yield the above stoichiometry. The solution was stirred while heating to approximately 90° C. until all the material had dissolved. To the nitrate solution was added about 400 ml of a mixture of polyols and organic catalyst. The mixture was thoroughly mixed by stirring with an impeller stirrer. Next, about 400 ml of polymeric isocyanates were added to the nitrate-polyols mixture. The precursor then obtained was mixed vigorously with a stirrer. Foaming occurred in about 5 minutes and the foam hardened in about 20 minutes.

The polyurethane foam with cations incorporated in its skeleton cell structure was then heat treated at 700° C. with a heating rate of 8° C./min and dwelling time of 2 hours. During the heat treatment, all organic substances were removed and extremely fine powder of YBa$_2$Cu$_3$O$_{7-y}$ was obtained.

EXAMPLE XXIII

This example describes the preparation of nanometer size CoO powder. This material is used to make catalysts. The starting metal nitrate used was Co(NO$_3$)$_2$.6H$_2$O. Approximately 30 g total of the preceding nitrate were mixed with about 60 g water. The solution was stirred while heating to approximately 90° C. until all the material had dissolved. To the nitrate solution was added about 200 ml of a mixture of polyols and organic catalyst. The mixture was thoroughly mixed by stirring with an impeller stirrer. Next, about 200 ml of polymeric isocyanates were added to the nitrate-polyols mixture. The precursor then obtained was mixed vigorously with a stirrer. Foaming occurred in about 5 minutes and the foam hardened in about 15 minutes.

The polyurethane foam with cations incorporated in its skeleton cell structure was then heat treated at 700° C. with a heating rate of 8° C./min and dwelling time of 2 hours. During the heat treatment, all organic substances were removed and extremely fine powder of CoO was obtained.

While in the foregoing specification this invention has been described in relation to certain preferred embodiments thereof and many details have been set forth for purpose of illustration, it will be apparent to those skilled in the art that the invention is susceptible to additional embodiments and that certain of the details described herein can be varied considerably without departing from the basic principles of the invention.

We claim:

1. A process for producing at least one of ceramic powders and metal powders comprising:
   homogeneously incorporating at least one metal cation into a polymeric foam, forming a metal cation-containing foam cell structure;
   calcining said metal cation-containing foam cell structure at a calcination temperature and a time required for complete removal of all organics and formation of a crystal phase, producing at least one of an oxide powder and a metal powder; and
   recovering said powder.

2. A process in accordance with claim 1 wherein said calcination temperature is between about 400° C. and about 1400° C. and said time is between about 1 minute and about 96 hours.

3. A process in accordance with claim 1, wherein said powder is a metal powders and further comprising cooling said metal powder to about room temperature in a reducing atmosphere.

4. A process in accordance with claim 1, wherein said powder is an oxide powders and further comprising reducing said oxide powder to form a metal powder.

5. A process in accordance with claim 1, wherein said polymeric foam is polyurethane foam.

6. A process in accordance with claim 1, wherein said metal cations are selected from the group of cations consisting of lanthanum, strontium, chromium, zirconium, yttrium, aluminum, lithium, iron, antimony, boron, cadmium, cesium, dysprosium, erbium, gold, hafnium, holmium, iridium, lutetium, mercury, molybdenum, niobium, osmium, palladium, platinum, praseodymium, rhenium, rhodium, rubidium, ruthenium, samarium, scandium, sodium, tantalum, terbium, throium, thulium, tin, titanium, tungsten, uranium, vanadium, ytterbium, and mixtures thereof.

7. A process in accordance with claim 1, wherein said metal cation-containing foam cell structure is produced by mixing an organic precursor of said polymeric foam with at least one metal cation salt in one of a solution and an oxide suspension, producing a foam mixture, and hardening said foam mixture.

8. A process in accordance with claim 7, wherein said at least one metal cation salt is selected from the group consisting of chlorides, carbonates, hydroxides, isopropoxides, nitrates, acetates, epoxides, oxalates, and mixtures thereof.

9. A process in accordance with claim 7 wherein said organic precursor comprises a mixture of an isocyanate and a hydroxyl containing compound.

10. A process in accordance with claim 7, wherein said metal cation salts are nitrates of a material selected from the group consisting of zirconium oxide, yttrium, lanthanum, strontium, chromium, aluminum, lithium, iron and mixtures thereof.

11. A process in accordance with claim 1, wherein said metal cation-containing foam cell structure is produced by impregnating said polymeric foam with a polymeric precursor solution comprising an alpha-hydrocarboxylic acid, a polyhydroxy alcohol and at least one metal cation salt, each of said metal cation salts being dissolved in a solvent which is non-destructive with respect to said polymeric foam, producing an impregnated polymeric foam, and
   heating said impregnated polymeric foam at a temperature between about 80° C. to about 150° C. until said solvent is removed.

12. A process in accordance with claim 11, wherein said alpha-hydrocarboxylic acid is citric acid.

13. A process in accordance with claim 11 wherein said polyhydroxy alcohol is ethylene glycol.

14. A process in accordance with claim 11 wherein said solvent is selected from the group consisting of water, acetone, alcohols and mixtures thereof.

15. A process in accordance with claim 14, wherein said solvent is water.

16. A process in accordance with claim 14, wherein said solvent is a mixture of ethanol and acetone in a ratio of approximately 1 to 1.

* * * * *